United States Patent [19]

Yokota et al.

[11] Patent Number: 5,439,977
[45] Date of Patent: Aug. 8, 1995

[54] ACID ANHYDRIDE-CONTAINING ONE PACKAGE OF EPOXY RESIN COMPOSITION

[75] Inventors: Tadahiko Yokota; Hiroyuki Sakata; Kiyomiki Hirai; Koji Takeuchi, all of Kawasaki, Japan

[73] Assignee: Ajinomoto Co., Inc., Tokyo, Japan

[21] Appl. No.: 227,995

[22] Filed: Apr. 15, 1994

Related U.S. Application Data

[63] Continuation-in-part of Ser. No. 38,249, Mar. 29, 1993, abandoned.

[51] Int. Cl.$^6$ ............... C08G 59/18; C08G 59/68; C08G 59/42
[52] U.S. Cl. ............... 525/113; 525/482; 525/484; 525/504; 525/526; 528/89; 528/90; 528/93; 528/94; 528/99; 528/104; 528/108; 528/109; 528/110; 528/112; 528/113; 528/114; 528/327; 528/341; 528/361; 528/407
[58] Field of Search ............... 525/526, 89, 90, 93, 525/94, 99, 104, 108, 109, 110, 112, 113, 114, 482, 484, 504; 528/327, 341, 361, 407

[56] References Cited

U.S. PATENT DOCUMENTS

| | | | |
|---|---|---|---|
| 3,301,795 | 1/1967 | Wooster | 528/114 |
| 3,756,984 | 12/1973 | Klaren et al. | 528/94 |
| 5,077,376 | 12/1991 | Dooley | 528/114 |

FOREIGN PATENT DOCUMENTS 0018949 11/1980 European Pat. Off.
0398700 11/1990 European Pat. Off.

OTHER PUBLICATIONS

Database WPIL, AN-83-62003k, JP-A-58 083 024, May 18, 1993.
Database WPIL, AN-88-253536, JP-A-63 183 920, Jul. 29, 1988.
Chemical Abstract 119:161721, "One-Component Liquid Epoxy Resin Composition Containing Sulfonylimidazole Catalysts and Their Heat-Cured Products", Yokota et al.

*Primary Examiner*—Frederick Krass
*Attorney, Agent, or Firm*—Oblon, Spivak, McClelland, Maier, & Neustadt

[57] ABSTRACT

An acid anhydride-containing one package epoxy resin composition consisting indispensably of (1) an epoxy resin having two or more epoxy groups in one molecule, (2) an acid anhydride, (3) at least one of (a) a liquid latent curing accelerator, (b) a latent curing accelerator soluble in an epoxy resin having two or more epoxy groups in one molecule and (c) a latent curing accelerator soluble in an acid anhydride, and (4) a dispersible latent curing accelerator, wherein the ratio of (1) to (2) is from 0.8 to 1.2, defined as the number of acid anhydride equivalents/the number of epoxy equivalents, and the amounts of (3) and (4) each are from 0.1 to 10 parts by weight to 100 parts by weight of the epoxy resin. The composition has excellent infiltrability, storage stability and reactivity.

9 Claims, No Drawings

ACID ANHYDRIDE-CONTAINING ONE PACKAGE OF EPOXY RESIN COMPOSITION

This application is a Continuation-In-Part of application Ser. No. 08/038,249, filed on Mar. 29, 1993, now abandoned.

BACKGROUND OF THE INVENTION

1. Field of the Invention

The present invention relates to an acid anhydride-containing one package epoxy resin composition having excellent processability and storage stability, which is useful for impregnating and casting and may rapidly harden under heat to provide a cured product having excellent electrical, thermal, and chemical properties.

2. Discussion of the Background

A low viscosity epoxy resin composition containing an acid anhydride as a curing agent is useful for infiltrating narrow slits. Because the resulting cured product has excellent electrical, mechanical, thermal, and chemical properties, it is widely used in various fields. For example, it is used as a sealant for condensers, an impregnant for coils, and a sealant for transformers of large-size motors, generators, and magnetic heads. In addition, the uncurred composition possesses excellent storage stability and a long pot life.

However, a composition comprising an epoxy resin and an acid anhydride requires a high temperature and a long time for curing. In order to overcome this drawback, tertiary amines or their salts (JP-A 64-60625, 59-140220— the term "JP-A" as used herein means an "unexamined published Japanese patent application"), imidazoles or their salts (JP-A 58-83024, 57-19001), organic phosphines (JP-A 63-304018, 57-40524), quaternary phosphonium salts (JP-A 1-25487, 61-151230) or the like are used as curing accelerators. Incorporating such curing accelerators into the composition improves hardenability but decreases storage stability. As a result of the poor storage stability of compositions containing such curing accelerators, it is necessary to prepare the compositions immediately prior to use. Thus, the epoxy resin, acid anhydride, and curing accelerator must be metered separately. Such an operation decreases processability and workability of the composition and causes metering errors. In addition, the excess stock of the composition cannot be stored but must be discarded, causing waste which is environmentally disadvantageous.

The use of a salt of p-toluenesulfonic acid and a tertiary amine such as triethylamine as a curing accelerator for the composition has been investigated (JP-A 60-4520). Although the storage stability of the resulting composition is good, the reactivity is not good.

In order to overcome both problems of storage stability and reactivity, the use of a dispersible latent curing accelerator has been investigated (JP-A 60-4524, 60-72917). A resin composition containing such a dispersible latent curing accelerator almost satisfies the storage stability and reactivity requirements. However, since the curing accelerator is an insoluble powder, the composition containing the insoluble powder cannot penetrate into narrow slits. As a result, the physical properties of the hardened product are unacceptable.

Thus, it is desirable to produce an acid anhydride-containing one package epoxy resin composition having excellent storage stability and reactivity while maintaining excellent processability and workability.

SUMMARY OF THE INVENTION

Accordingly, one object of the present invention is to provide an acid anhydride-containing one package epoxy resin composition having excellent storage stability and reactivity while maintaining excellent processability and workability.

Another object of the present invention is to provide a hardened composition having excellent electrical, mechanical, thermal, and chemical properties from an acid anhydride-containing one package epoxy resin composition having excellent storage stability and reactivity while maintaining excellent processability and workability.

Further objects of the present invention will be apparent from the discription hereinbelow.

The present invention provides an acid anhydride-containing one package epoxy resin composition having improved storage stability and reactivity while maintaining excellent processability and workability comprising (1) an epoxy resin having two or more epoxy groups in one molecule, (2) an acid anhydride, (3) at least one of (a) a liquid latent curing accelerator, (b) a latent curing accelerator soluble in an epoxy resin having two or more epoxy groups in one molecule and (c) a latent curing accelerator soluble in an acid anhydride, and (4) a dispersible latent curing accelerator, wherein the ratio of (1) to (2) is from 0.8 to 1.2, defined as the number of acid anhydride equivalents/the number of epoxy equivalents, and the amounts of (3) and (4) each are from 0.1to 10 parts by weight to 100 parts by weight of the epoxy resin. In addition, a cured composition having excellent electrical, mechanical, thermal, and chemical properties may be obtained by heating the above acid anhydride-containing one package epoxy resin composition.

DETAILED DESCRIPTION OF THE PREFERRED EMBODIMENT

The epoxy resin used in the present invention is not specifically restricted and may include any expoxy resin having, on the average, two or more epoxy groups in one molecule. Exemplary epoxy resins include polyglycidyl ethers obtained by reacting polyhydric phenols such as bisphenol A, bisphenol F, bisphenol AD, catechol, resorcinol, polyhydric alcohols such as glycerin, or polyethylene glycol and epichlorohydrin; glycidylether esters obtained by reacting hydroxycarboxylic acids such as p-hydroxybenzoic acid or beta-hydroxynaphthoic acid and epichlorohydrin; polyglycidyl esters obtained by reacting polycarboxylic acids such as phthalic acid or terephthalic acid and epichlorohydrin; and epoxidated phenol-novolak resins, epoxidated cresol-novolak resins, epoxidated polyolefins and urethane-modified epoxy resins.

The acid anhydride used in the present invention is not specifically restricted and may include, for example, anhydrides of dicarboxylic acids and acids having more than two carboxylic groups such as phthalic acid anhydride, trimellitic acid anhydride, pyromellitic acid anhydride, benzophenone-tetracarboxylic acid anhydride, ethylene glycol bis-trimellitate, glycerol tris-trimellitate, maleic anhydride, tetrahydrophthalic acid anhydride, methyltetrahydrophthalic acid anhydride, endomethylenetetrahydrophthalic acid anhydride, methylendomethylenetetrahydrophthalic acid anhydride, methylbutenyltetrahydrophthalic acid anhydride, dodecenylsuccinicacidanhydride, hexahydrophthalic acid anhydride, methylhexahydrophthalic acid anhydride, succinic acid anhydride, methylcyclohexenedicarboxylic acid anhydride, alkylstyrene-maleic anhydride copolymers, chlorendic acid anhydride, tetrabromophthalic acid anhydride, and polyazelaic acid anhydride.

The latent curing accelerator used in the present invention is at least one of a liquid curing accelerator, a curing accelerator soluble in an epoxy resin having two or more epoxy groups in one molecule, and a curing accelerator soluble in an acid anhydride, and possess sufficient accelerating ability in curing an acid anhydride and may be incorporated into an acid anhydride-containing one package epoxy resin composition to prolong the storage stability of the composition for at least one week or more. Exemplary latent curing accelerators include secondary amines and their salts, reaction products of a compound having one or more isocyanato group in one molecule and a secondary amine, and imidazole compounds in which the nitrogen atom in the 1-position has been sulfonylated, but these are not limitative. The latent curing accelerators may be used singly or in combination of two or more.

Secondary amines useful as latent curing accelerators in the present invention are not specifically restricted. They include, for example, dimethylamine, diethylamine, di-n-propylamine, di-n-butylamine, di-n-hexylamine, di-n-octylamine, diethanolamine, morpholine, piperidine, 2,6-dimethylpiperidine, 2,2,6,6-tetramethylpiperidine, piperazine, pyrrolidine, and N-methylbenzylamine. The secondary amines may be in the form of a salt with a carboxylic acid, a compound having phenolic hydroxyl group(s), a sulfonic acid, an acidic phosphate ester, a phosphonic acid or an inorganic acid.

The reaction product of a compound having one or more isocyanato group in one molecule and a secondary amine, which is used as the latent curing accelerator in the present invention, may be prepared by mixing an isocyanato group-containing compound and a secondary amine in an organic solvent such as chloroform or toluene or in the absence of a solvent or by adding a secondary amine to a mixture comprising an epoxy resin and an isocyanato group-containing compound.

The compound having one or more isocyanato group in one molecule for use in the present invention is not specifically restricted. It includes, for example, n-butyl isocyanate, isopropyl isocyanate, 2-chloroethyl isocyanate, phenyl isocyanate, p-chlorophenyl isocyanate, benzyl isocyanate, hexamethylene diisocyanate, 2-ethylphenyl isocyanate, 2,6-dimethylphenyl isocyanate, 2,4-toluene diisocyanate, toluylene diisocyanate, 2,6-toluene diisocyanate, 1,5-naphthalene diisocyanate, diphenylmethane-4,4'-diisocyanate, tolidine diisocyanate, isophorone diisocyanate, xylylene diisocyanate, paraphenylene diisocyanate, 1,3,6-hexamethylene triisocyanate, and bicycloheptane triisocyanate.

The secondary amine to be reacted with the compound having one or more isocyanate group in one molecule is not specifically restricted. It may be, for example, any of the previously disclosed secondary amines.

The imidazole compound wherein the nitrogen atom at the 1-position has been sulfonylated, which is used as the latent curing accelerator in the present invention, includes, for example, those in which the nitrogen atom at the 1-position of the imidazole skeleton has been p-toluene-sulfonylated, benzene-sulfonylated, methane-sulfonylated or trifluoromethane-sulfonylated.

The imidazole compound where the nitrogen atom at the 1-position has been sulfonylated may be prepared by reacting the corresponding imidazole compound and the corresponding sulfonyl chloride compound in an organic solvent such as chloroform, dichloromethane or toluene in the presence of a tertiary amine such as triethylamine.

The imidazole compound is not specifically restricted. It includes, for example, imidazole, 2-methylimidazole, 2-ethylimidazole 2-n-propylimidazole, 2-isopropylimidazole, 2-phenylimidazole, 2-n-undecylimidazole, 2-n-heptadecylimidazole, 4-methylimidazole, 4-phenylimidazole, 2-ethyl-4-methylimidazole, 4-methyl-2-phenylimidazole, 4,5-diphenylimidazole, 2-phenyl-4,5dihydroxymethylimidazole, 2-phenyl-4-methyl-5-hydroxymethyl-imidazole, and 2-phenyl-4-benzyl-5-hydroxymethylimidazole.

The dispersible latent curing accelerator for use in the present invention is a solid curing accelerator which is insoluble in an epoxy resin at room temperature and which is solubilized under heat to act as a curing accelerator. Commercially available dispersible latent curing accelerators include amine-epoxy adducts and amine-urea adducts.

The solid dispersion-type amine adduct latent curing accelerator to be used according to the present invention is the product of a reaction between an amine compound and an epoxy compound which is a solid insoluble in the epoxy resin at room temperature and which functions as an accelerator by becoming soluble upon heating; this also includes those reaction products whose surfaces have been treated with an isocyanate compound or acidic compound, etc.

As examples of the epoxy compound to be used as a starting material for the production of the latent curing accelerator which is used according to the present invention may be mentioned polyfunctional epoxy compounds such as polyglycidyl ethers which are obtained by, reacting a polyhydric phenol such as bisphenol A, bisphenol F, catechol, resorcinol, etc. or a polyhydric alcohol such as glycerin or polyethylene glycol, etc. with epichlorohydrin; glycidyl ether esters which are obtained by reacting a hydroxycarboxylic acid such as p-hydroxybenzoic acid or S-hydroxynaphthoic acid with epichlorohydrin; polyglycidyl esters which are obtained by reacting at polycarboxylic acid such as phthalic acid or terephthalic acid with epichlorohydrin; glycidylamine compounds which are obtained by reacting 4,4'-diaminodiphenylmethane, m-aminophenol or the like with epichlorohydrin; and epoxidized phenolic novolac resins, epoxidized cresolnovolac resins, epoxidized polyolefins, as well as monofunctional epoxy compounds such as butyl glycidyl ethers, phenyl glycidyl ethers, glycidyl methacrylate and the like, but the epoxy compound is not limited to these examples.

The amine compound to be used as a starting material for the production of the latent curing accelerator which is used according to the present invention may be any one which has in its molecule one or more active hydrogens capable of an addition reaction with an epoxy group, as well as one or more substituents selected from primary, secondary and tertiary amino groups. Examples of such an amine compound are given below, but it is not limited thereto.

It may be, for example, an aliphatic amine such as diethylenetriamine, triethylenetetraamine, n-propylamine, 2-hydroxyethylaminopropylamine, cyclohexylamine, 4,4'-diaminodicyclohexylmethane; an aromatic amine compound such as 4,4'-diaminodiphenylmethane, 2-methylaniline, etc.; or a nitrogenous heterocyclic compound such as 2-ethyl-4-methylimidazole, 2-methylimidazole, 2-ethyl-4-methylimidazoline, 2,4-dimethylimidazoline, piperidine, piperazine, etc.

Furthermore, of these compounds, particularly those which have tertiary amino groups in their molecules are materials which will provide latent curing accelerators with excellent accelerating properties, and examples of such compounds include, for example, amine compounds such as dimethylaminopropylamine, diethylaminopropylamine, di-n-propylaminopropylamine, dibutylaminopropylamine, dimethylaminoethylamine, diethylaminoethylamine, methylpiperazine, etc.; primary and secondary amines which have a tertiary amino group in their molecules, such as imidazole compounds like 2-methylimidazole, 2-ethylimidazole, 2-ethyl-4-methylimidazole, 2-phenylimidazole, etc.; and alcohols, phenols, thiols, carboxylic acids, hydrazides, etc. which have a tertiary amino group in their molecules, including 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, 1-(-2-hydroxy-3-phenoxypropyl) 2-methylimideizole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-methylimidazoline, 2-(dimethylaminomethyl) phenol, 2,4,6-tris(dimethylaminomethyl) phenol, N-$\beta$-hydroxyethylmorpholine 2-dimethylaminoethanethiol, 2-mercaptopyridine, 2-mercaptobenzoimidazole, 2-mercaptobenzathiazole, 4-mercaptopyridine, N,N-dimethylaminobenzoic acid, N,N-dimethylglycine, nicotinic acid, isonicotinic acid, picolinic acid, N,N-dimethylglycine hydrazide, N,N-dimethylpropionic acid hydrazide, nicotinic acid hydrazide, isonicotinic acid hydrazide, etc.

In order to further improve the shelf life of the epoxy resin composition according to the present invention, when the addition reaction is conducted with the above mentioned epoxy compound and amine compound to produce the latent curing accelerator to be used according to the present invention, an active hydrogen compound having 2 or more active hydrogens in its molecule may be added thereto as a third component. Examples of such an active hydrogen compound are given below, but it is not limited thereto.

It may be, for example, a polyhydric phenol such as bisphenol A, bisphenol F, bisphenol S, hydroquinone, catechol, resorcinol, pyrogallol, phenolic novolac resin, etc.; a polyhydric alcohol such as trimethylolpropane, etc.; a polyhydric carboxylic acid such as adipic acid, phthalic acid, etc.; or 1,2-dimercaptoethane 2-morcaptoethanol, 1-mercapto-3-phenoxy-2-propanol, mercaptoacetic acid, anthranilic acid, lactic acid, etc.

Representative examples are given below of the isocyanate compound to be used as the surface treatment agent for the production of the latent curing accelerator used according to the present invention, but it is not limited thereto these examples.

It may be, for example, a monofunctional isocyanate compound such as n-butyl isocyanate, isopropyl isocyanate, phenyl isocyanate, benzyl isocyanate, etc.; a polyfunctional isocyanate compound such as hexamethylene diisocyanate, toluilene diisocyanate, 1,5-naphthalene diisocyanate, diphenylmethane-4,4'-diisocyanate, isophorone diisocyanate, xylylene diisocyanate, p-phenylene diisocyanate, 1,3,6-hexamethylene triisocyanate, bicycloheptane triisocyanate, etc.; and also terminal isocyanate-containing compounds obtained by reactions of these polyfunctional disocyanate compounds and active hydrogen compounds may be used, examples of which include a terminal isocyanate-containing addition reaction product obtained, by a reaction of toluilene diisocyanate with trimethylolpropane, and a terminal isocyanate-containing addition reaction product obtained by a reaction of toluilene diisocyanate with pentaerythritol.

The acidic substance may be, for example, carbon dioxide, sulfur dioxide, sulfuric acid, hydrochloric acid, oxalic acid, phosphoric acid, acetic acid, formic acid, propionic acid, adipic acid, caproic acid, tactic acid, succinic acid, tartaric acid, sebacic acid, p-toluenesulfonic acid, salicylic acid, boric acid, tannic acid, alginic acid, polyacrylic acid, polymethacrylic acid, phenol, pyrogallol, phenol resin, resorcin resin, etc.

The latent curing accelerator to be used according to the present invention may be easily obtained mixing the above mentioned components (a) an epoxy compound and (b) an amine compound, or (a) an epoxy compound, (b) an amine compound and (c) an active hydrogen compound, and reacting them at from room temperature to 200° C., and then solidifying and crushing the product thereof, or by reacting them in a solvent such as methyl ethyl ketone, dioxane, tatrahydrofuran or the like, removing the solvent, and then crushing the solid fraction thereof. Furthermore, the surface treatment of these latent curing accelerators may be carried out by contacting them with any of the above mentioned isocyanate compounds or acidic compounds in a solvent such as methyl ethyl ketone, toluene, etc. or with no solvent.

Commercially available representative examples of the above mentioned solid dispersion-type amine adduct latent curing accelerator are given below, but it is not limited to these examples. For example, mention may be made of "AJICURE PN-23" (trademark, Ajinomoto, Inc.), "AJICURE PN-H" (trademark, Ajinomoto, Inc.), "AJICURE MY-24" (trademark, Ajinomoto, Inc.), "HARDENER X-3661S" (trademark, A.C.R. Co., Ltd.), "HARDENER X-3670S" (trademark, A.C.R. Inc.), "NOVACURE HX-3742" (trademark, Asahi Chemical Industry Co., Ltd.), "NOVACURE HX-3721" (trademark, Asahi Chemical Industry Co., Ltd.), etc.

In addition, as the accelerator may be used a solid dispersion-type latent curing accelerator, such as the one described in Japanese Patent Application Publication HEI 3-296525 which is obtained by reacting an epoxy resin having 2 or more epoxy groups in its molecule as a third ingredient during a reaction with N,N-dialkylaminoalkylamine, an amine having an active hydrogen in its molecule and having a cyclic structure which includes one or two nitrogen atoms, and a diisocyanate.

Commercially available dispersion-type latent curing accelerators include "FUJICURE FXE-1000" (trademark, Fuji Chemical Industry Co., Ltd.), "FUJICURE FXR-1030" (trademark, Fuji Chemical Industry Co., Ltd.), etc.

The ratio of the epoxy resin and the acid anhydride in the acid anhydride-containing one package epoxy resin composition is from 0.8 to 1.2 as (the number of acid anhydride equivalent)/(the number of epoxy equivalent). The acid anhydride equivalent is represented by (the molecular weight of acid anhydride)/(the number of acid anhydride groups). The amounts of the latent curing accelerator(s) and the dispersible curing accelerator each are from 0.1 to 10 parts by weight to 100 parts by weight of the epoxy resin in the composition.

The acid anhydride-containing one package epoxy resin composition of the present invention may contain, if desired, various additives such as filler, diluent, solvent, pigment, elasticity-imparting agent and antioxidant.

The acid anhydride-containing one package epoxy resin composition of the present invention has excellent infiltrability, storage stability and reactivity and the cured product possesses excellent electrical, mechanical, thermal, and chemical properties. Therefore, it is suitable for use in various fields including sealants for condensers, impregnants for coils, and sealants for transformers of large-size motors, generators, and magnetic heads.

In addition, since the composition has excellent storage stability, in-line supply of the composition containing the three indispensable components of epoxy resin base, acid anhydride curing agent and curing accelerator is possible. Accordingly, metering the respective components just before use is not necessary thereby providing a composition free of metering errors. The composition of the present invention is therefore extremely advantageous because of its improved processability and workability. Since excess composition may be stored for later use, the remaining unused composition need not be discarded. Thus, the composition of the present invention is additionally advantageous in terms of preserving natural resources and protecting the environment.

Other features of the invention will become apparent in the course of the following descriptions of exemplary embodiments which are given for illustration of the invention and are not intended to be limiting thereof.

EXAMPLE 1

100 parts by weight of bisphenol A type epoxy resin "EPIKOTE 828" (trade name of product by Yuka Shell Co.; having an epoxy equivalent of 190) and 85 parts by weight of methylhexahydrophthalic acid anhydride "HN-5500" (trade name of product by Hitachi Chemical Co.; having an acid anhydride equivalent of 166) were mixed; and 2 parts by weight of diethylamine and one part by weight of "AJICURE MY-24" (trade name of product by Ajinomoto Co.) were added thereto. The mixture was blended with defoaming to obtain acid anhydride-containing one-package epoxy resin composition (A).

EXAMPLE 2

100 parts by weight of "EPIKOTE 828" and 85 parts by weight of "HN-5500" were mixed; 6.6 parts by weight of dibutylamine salt (liquid) of 2-N, N-dibutylcarbamoyl-4-methylcyclohexanecarboxylic acid, which is a reaction product of one mol of methylhexahydrophthalic acid anhydride and 2 mols of n-dibutylamine, and 2 parts by weight of "AJICURE MY-24" were added thereto. The mixture was blended with defoaming to obtain acid anhydride-containing one package epoxy resin composition (B).

EXAMPLE 3

100 parts by weight of "EPIKOTE 828" and 85 parts by weight of "HN-5500" were blended; 7.1 parts by weight of di-n-hexylamine salt (liquid) of 2-ethylhexanoic acid and 2 parts by weight of "AJICURE MY-24" were added thereto. The mixture was blended with defoaming to obtain acid anhydride-containing one package epoxy resin composition (c).

EXAMPLE 4

4 parts by weight of N,N-diethyl-N'-phenylurea, which is a reaction product of phenyl isocyanate and diethylamine, was dissolved in 85 parts by weight of "HN-5500" at room temperature; 100 parts by weight of "EPIKOTE 828" and 2 parts by weight of "AJICURE MY-24" were added thereto. The mixture was blended with defoaming to obtain acid anhydride-containing one package epoxy resin composition (D).

EXAMPLE 5

100 parts by weight of "EPIKOTE 828" and 85 parts by weight of "HN-5500" were mixed; and one part by weight of 1-P-toluenesulfonyl-2-isopropylimidazole and 2 parts by weight of "AJICURE MY-24" were added thereto. The mixture was blended with defoaming to obtain acid anhydride-containing one package epoxy resin composition (E).

Comparative Examples 1 to 3

The components shown in Table 1 below were blended with defoaming to obtain acid anhydride-containing epoxy resin compositions (F) to (H).

TABLE 1

| Composition (parts by weight) | (F) | (G) | (H) |
|---|---|---|---|
| "EPIKOTE 828" | 100 | 100 | 100 |
| "HN-5500" | 85 | 85 | 85 |
| Benzyldimethylamine | 1 | — | — |
| Triethylamine Salt of P-toluenesulfonic Acid | — | — | 6 |
| "AJICURE MY-24" | — | 2 | 2 |

Experimental Example 1

The stability, reactivity and infiltrability of the compositions of Examples 1 to 5 and Comparative Examples 1 to 3 were tested and evaluated. The stability was evaluated as the viscosity of each composition after being stored for one month, and the reactivity was evaluated as the gelling time of each composition at 120° C.

The viscosity was measured in accordance with JIS-K 6833, and the gelling time was measured with a Yasuda Gel Timer. Each composition was cured at a determined time for a determined period of time, and the glass transition temperature of the cured product was measured by a TMA penetration method using a thermal mechanical analyzer (TMA, manufactured by Rigaku Denki KK). As the measuring condition, the temperature elevating speed was 10° C./min, and a needle load having a weight of 10 g and a diameter of one mm was used.

The infiltrability was evaluated by the method described below.

Two sheets of slide glass (76 mm × 26 mm, thickness 1 mm) were laid over with each other, with the upper sheet being slid by 5 mm, and they were fixed with a clip. They were set vertically with the long side being horizontal. The epoxy resin composition sample was applied to the slit between the thus laid two sheets of slide glass and left as it was for three hours, whereupon the sample was ascertained to infiltrate into the slit between the two sheets due to the capillary phenomenon. The composition was hardened at 120° C. for 2 hours, and the attached parts were peeled off from each other to check as to whether or not the composition between the parts was cured. The results obtained are shown in Table 2 below.

TABLE 2

| Composition | Viscosity (poise) | | Gelling Time (min), 120° C. | Infiltrability |
| --- | --- | --- | --- | --- |
| | Fresh sample | After 1 month at 25° C. | | |
| Ex. 1(A) | 9 | 21 | 22 | Good |
| Ex. 2(B) | 9 | 23 | 12 | Good |
| Ex. 3(C) | 8 | 16 | 12 | Good |
| Ex. 4(D) | 5 | 15 | 12 | Good |
| Ex. 5(E) | 6 | 200 | 12 | Good |
| Comp. Ex. 1(F) | 10 | gelled | 9 | Good |
| Comp. Ex. 2(G) | 9 | 13 | 12 | Bad |
| Comp. Ex. 3(H) | 10 | 13 | 12 | Bad |

From the results in Table 2 above, it is understood that the samples (A) to (E) of the present invention are improved over the comparative samples (F) to (H) with respect to both the storage stability and the infiltrability.

Experimental Example 2

The samples (A), (B) and (C) of the present invention were cured to obtain hardened products, and the physical properties of each are shown in Table 3 below.

TABLE 3

| Cured Products | (A) | (B) | (C) |
| --- | --- | --- | --- |
| Glass Transition Temperature (°C.) | 108 | 104 | 102 |
| Dielectric Constant (25° C., 1 kHz) | 3.6 | 3.6 | 3.5 |
| Dielectric Loss Tangent (25° C., 1 kHz) | 0.5 | 0.5 | 0.5 |
| Water Absorption (%) | 0.17 | 0.15 | 0.13 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An acid anhydride-containing one package epoxy resin composition comprising
   (1) 100 pbw of an epoxy resin having two or more epoxy groups in one molecule;
   (2) an acid anhydride, wherein the ratio of acid anhydride equivalents in (2) to the number of epoxy equivalents in (1) is from 0.8 to 1.2;
   (3) 0.1 to 10 pbw of a monosecondary monoamine or a salt thereof; and
   (4) 0.1 to 10 pbw of an imidazole-epoxy adduct, the amounts of (3) and (4) being on 100 pbw of (1) for each.

2. The acid anhydride-containing one package epoxy resin of claim 1, wherein the epoxy component of said imidazole-epoxy adduct is selected from the group consisting of polyglycidyl ethers, glycidyl ether esters, polyglycidyl esters, glycidylamine compounds, epoxidized phenolic novolac resins, epoxidized cresolnovolac resins, epoxidized polyolefins, butyl glycidyl ethers, phenyl glycidyl ethers and glycidyl methacrylate.

3. The acid anhydride-containing one package epoxy resin of claim 1, wherein the imidazole component of said imidazole-epoxy adduct is selected from the group consisting of 2-ethyl-4-methylimidazole, 2-methylimidazole, 2-ethylimidazole, 2-phenylimidazole 1-(-2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 2-mercaptobenzoimidazole and 1-(2-hydroxy-3-butoxypropyl)-2-ethyl-4-methylimidazole.

4. The acid anhydride-containing one package epoxy resin of claim 1, wherein said imidazole-epoxy adduct is further prepared from an active hydrogen compound having 2 or more active hydrogens.

5. The acid anhydride-containing one package epoxy resin of claim 4, wherein said active hydrogen compound having 2 or more active hydrogens is selected from the group consisting of polyhydric phenols, polyhydric alcohols, polyhydric carboxylic acids, 1,2-dimercaptoethane, 2-mercaptoethanol, 1-mercapto-3-phenoxy- 2-propanol, mercaptoeacetic acid, anthranilic acid and lactic acid.

6. The acid anhydride-containing one package epoxy resin composition as claimed in claim 1, wherein the monosecondary monoamine is selected from the group consisting of dimethylamine, diethylamine, di-n-propylamine, di-n-butylamine, di-n-hexylamine, de-n-octylamine, diethanolamine, morpholine, piperidine, 2,6-dimethylpiperidine, 2,2,6,6-tetramethylpiperidine, pyrrolidine, and N-methylbenzylamine.

7. The acid anhydride-containing one package epoxy resin composition as claimed in claim 1, wherein the monosecondary monoamine is in the form of a salt with a carboxylic acid, a compound having phenolic hydroxyl group(s), a sulfonic acid, an acidic phosphate ester, a phosphonic acid or an inorganic acid.

8. The acid anhydride-containing one package epoxy resin composition of claim 1, wherein said imidazole-epoxy adduct is a solid which is insoluble in an epoxy resin at room temperature and which is solubilized under heat to act as a curing accelerator.

9. A cured product obtained by heating an acid hydride-containing one package epoxy resin composition as claimed in claim 1.

* * * * *